(12) United States Patent
Gillespie et al.

(10) Patent No.: US 8,516,057 B2
(45) Date of Patent: Aug. 20, 2013

(54) SUBSCRIBER LIST SYSTEM AND METHOD

(75) Inventors: Adam Thomas Gillespie, San Diego, CA (US); Tyler Glendon Wardhaugh, San Diego, CA (US)

(73) Assignee: Digital River, Inc., Minnetonka, MN (US)

( * ) Notice: Subject to any disclaimer, the term of this patent is extended or adjusted under 35 U.S.C. 154(b) by 440 days.

(21) Appl. No.: 11/565,618

(22) Filed: Nov. 30, 2006

(65) Prior Publication Data

US 2007/0124401 A1 May 31, 2007

Related U.S. Application Data

(60) Provisional application No. 60/741,535, filed on Nov. 30, 2005.

(51) Int. Cl.
*G06F 15/16* (2006.01)
*G06F 15/173* (2006.01)

(52) U.S. Cl.
USPC .......................................... 709/206; 709/224

(58) Field of Classification Search
USPC ................. 707/100; 709/206–209; 715/962
See application file for complete search history.

(56) References Cited

U.S. PATENT DOCUMENTS

| | | | |
|---|---|---|---|
| 5,201,010 A * | 4/1993 | Deaton et al. | ................. 382/139 |
| 5,263,167 A | 11/1993 | Conner, Jr. et al. | |
| 5,265,033 A | 11/1993 | Vajk et al. | |
| 5,404,518 A | 4/1995 | Gilbertson et al. | |
| 5,793,972 A | 8/1998 | Shane | |
| 5,818,447 A | 10/1998 | Wolf et al. | |
| 5,937,162 A | 8/1999 | Funk et al. | |
| 5,966,695 A | 10/1999 | Melchione et al. | |
| 5,978,799 A | 11/1999 | Hirsch | |
| 6,055,510 A | 4/2000 | Henrick et al. | |
| 6,055,573 A | 4/2000 | Gardenswartz et al. | |
| 6,101,485 A | 8/2000 | Fortenberry et al. | |
| 6,236,977 B1 | 5/2001 | Verba et al. | |
| 6,249,807 B1 | 6/2001 | Shaw et al. | |
| 6,282,565 B1 | 8/2001 | Shaw et al. | |
| 6,351,523 B1 | 2/2002 | Detlef | |
| 6,356,286 B1 | 3/2002 | Lawrence | |
| 6,360,254 B1 | 3/2002 | Linden et al. | |

(Continued)

OTHER PUBLICATIONS

Bulk Email Marketing List Management. Datasheet [online]. SilverPop 2006 [retrieved on Dec. 4, 2006]. Retrieved from the Internet: <URL: http://www.silverpop.com/whatweoffer/technology/listmanagement/index.html>.

(Continued)

*Primary Examiner* — Evans Desrosiers
(74) *Attorney, Agent, or Firm* — Lynn M. Holly; Richard E. Billion; Shawn B. Dempster

(57) ABSTRACT

The present invention is related to a software system that solves the above-mentioned problems. In accordance with one embodiment of the invention, a computerized subscriber list creation and management system for use on the internet or other network is described. In a preferred embodiment of the invention, a business may conduct advanced database search queries, then save, manage and update those searches automatically. A business may build subscriber lists using multi-part rules determined by customer data including demographics, preferences, and behaviors. Moreover, the business may save the searches and manage database segments effectively for use in multiple campaigns. Subscriber lists update automatically as the database grows and changes.

12 Claims, 10 Drawing Sheets

(56) References Cited

U.S. PATENT DOCUMENTS

| | | |
|---|---|---|
| 6,377,936 B1 | 4/2002 | Henrick et al. |
| 6,449,635 B1 | 9/2002 | Tilden, Jr. et al. |
| 6,477,509 B1 | 11/2002 | Hammons et al. |
| 6,549,950 B2 | 4/2003 | Lytle et al. |
| 6,615,207 B1 | 9/2003 | Lawrence |
| 6,615,241 B1 | 9/2003 | Miller et al. |
| 6,618,747 B1 | 9/2003 | Flynn et al. |
| 6,633,850 B1 | 10/2003 | Gabbard et al. |
| 6,668,281 B1 | 12/2003 | Ayyadurai |
| 6,694,353 B2 | 2/2004 | Sommerer |
| 6,721,784 B1 | 4/2004 | Leonard et al. |
| 6,816,855 B2 | 11/2004 | Hartel et al. |
| 6,826,572 B2 | 11/2004 | Colace et al. |
| 6,839,680 B1* | 1/2005 | Liu et al. .................. 705/10 |
| 6,854,007 B1 | 2/2005 | Hammond |
| 6,941,304 B2 | 9/2005 | Gainey et al. |
| 7,065,555 B2 | 6/2006 | Foulger et al. |
| 7,113,948 B2 | 9/2006 | Jhingan et al. |
| 2002/0010747 A1* | 1/2002 | Jaehyuk-Hwang ........... 709/206 |
| 2002/0032602 A1* | 3/2002 | Lanzillo et al. ................ 705/14 |
| 2002/0082919 A1 | 6/2002 | Landau et al. |
| 2003/0149737 A1* | 8/2003 | Lambert et al. ............. 709/214 |
| 2005/0175021 A1 | 8/2005 | Ozugur et al. |
| 2005/0177844 A1 | 8/2005 | Levi et al. |
| 2005/0203800 A1 | 9/2005 | Sweeney et al. |
| 2005/0203807 A1* | 9/2005 | Bezos et al. ................... 705/26 |
| 2005/0228899 A1* | 10/2005 | Wendkos et al. ............. 709/232 |

OTHER PUBLICATIONS

Ranchero Software Smartlists. Datasheet [online]. Newsgator Technologies, Inc. 2006. [retrieved on Dec. 4, 2006]. Retrieved from the Internet: <URL: http://ranchero.com/netnewswire/features/smartLists.php>.

Dataviz SmartList to Go v3.0 CD-ROM Software. Datasheet [online]. The Palm Store, 2006. [retrieved on Dec. 4, 2006]. Retrieved from the Internet: <URL: http://store.palm.com/sm-dataviz-smartlist-to-go-v3-0-cd-rom-software—pi-1803588.html>.

* cited by examiner

─ 172      ─ 116

Smart List Summary
Total Subscriber Results as of today: 2

Choose Groups to Exclude from this Smart List
Category / Cats
☐ mr meows            ☐ samantha
☐ paws                ☐ qqq
☐ shoot the designer
Category / timers
☐ kitty               ☐ muffin
Category / test
< no groups in category >
Uncategorized
☐ throwaway name      ☐ test1

[ Go Back ] [ Submit ]

SUBSCRIBER LIST SYSTEM AND METHOD

RELATED APPLICATIONS

This application claims the benefit of U.S. Provisional Application No. 60/741,535 filed 30 Nov. 2005, entitled "Smart Lists," which is incorporated herein by reference.

This application is related to co-pending:
U.S. patent application Ser. No. 11/565,604, filed Nov. 30, 2006, entitled "Dynamic Content System and Method";
U.S. patent application Ser. No. 11/607,746, filed Nov. 30, 2006, entitled "Recurring Message System and Method"; and
U.S. patent application Ser. No. 11/565,613, filed Nov. 30, 2006, entitled "Sub Accounts System and Method", all of which are herein incorporated by reference.

FIELD OF THE INVENTION

The present invention relates to electronic mail messaging campaign systems for use on the internet. More particularly, the present invention relates to a system and related tools for creating and maintaining subscriber email.

BACKGROUND OF THE INVENTION

Targeting customers with e-mail marketing is like going on a date. The electronic commerce (e-commerce) company makes the customer comfortable by providing information, and the customer tries to understand what the e-commerce company is all about. If the customer likes the e-commerce company there is a second date, and then eventually marriage.

E-commerce companies love e-mail, and for good reason. Production costs are low; results are immediate. Personalized e-mail are messages that consumers sign up to receive or that companies can target at customers based on their previous purchases. Furthermore, targeted e-mail marketing requires a much bigger investment than simply blasting out untargeted e-mail messages because it involves sophisticated databases and statistical modeling.

Targeted e-mail is also more prone to error. Sending a personalized message to the wrong person can ruin a relationship for life. So can a message that overloads a customer's computer. But as long as the e-commerce company chooses the right words and format, experts agree that talking to customers is not only good for sales but also good for name recognition. Any excuse to interact with your customer is healthy for the brand, and targeted e-mail seems to be one of healthiest direct-marketing ways to build brand equity.

Accordingly, the ability to market a product or service to individuals who are accessible on the Internet is becoming increasingly important. Email systems exist today for sending email to a target set of email addresses for purposes such as marketing, information acquisition, and otherwise. A system for sending email to a number of email targets for such purposes may be called an email campaign.

Present email campaigns may suffer from difficulties in locating a pool of relevant individuals to be contacted. In a small email campaign, each email sent is critical to the success of the campaign, and needs to be carefully created. In other situations, large numbers of individuals to be contacted may have been found. This may result in increased difficulty in tailoring the large number of required email messages to the individuals for more effective contact.

Furthermore, once an email campaign has been initiated, difficulties in measuring success of the email campaign are presented. Effective ways for determining whether email recipients have received email from the email campaign have been sought. Also, effective ways for allowing the email recipients to provide feedback have also been sought. It is desirable for the email recipients to be able to respond with feedback, and for the quantity and content of the responses to be monitored and tracked. Furthermore, conducting advanced database search queries, then saving and managing these searches automatically is desirable as well.

Respecting subscribers to an email is also important. A message that's too focused risks missing out on impulse or crossover buys. According to a recent survey by Return Path, the number of consumers who are reporting opt-in email as spam to their Internet Service Provider (ISP) is up from 23.4% at the end of 2004 to nearly 34% at the end of 2005. The top reasons cited for the increase are lack of content relevancy and ratcheting up frequency beyond subscriber expectations. Moreover, according to a new Hostway survey, 70% of consumers said they would not purchase from websites that committed these pet peeves: pop-up advertising, registration log-on pages, software installation, and slow-loading pages. In addition, there is powerful evidence citing how effective email is when driving traffic to an online sale. In a recent Email Insider report, retailers who used email to promote post-holiday sales saw traffic increases of up to 700% above pre-holiday numbers.

Email deliverability will continue to be a major issue, and there are several deliverability challenges. Some, like authentication methods and challenge-response functionality, will be addressable by meeting technological specifications. But the most important factors affecting deliverability will continue to be reputation and respectful sending practices.

Furthermore, e-marketers' use of segmentation strategies and testing will become increasingly sophisticated. Marketers are getting smarter, and the technology is, too. Upcoming advances in email functionality like easier-to-use dynamic content, more robust testing capabilities, and deeper integration with web analytics providers will give businesses even more actionable information to drive sales and build relationships.

Additionally, there is a right and wrong way to build a list. A list is basically a database of subscribers. If a business wants to build an email marketing program, the best thing is not to purchase or borrow a list. Otherwise, they will be reported as a spammer. The best, most effective way to obtain a good list is to build it from the ground up. Building a database doesn't have to be difficult. In fact, it is one of the best ways to streamline marketing strategy to deliver measurable returns. In growing a quality permission—based list, the website is the best and most obvious place to build a list. If someone is surfing on the website, the business has a stellar opportunity to transform a web user from an interested party to a loyal patron. Usually there will be some link on the website that asks users to "Register Now" or "Subscribe Today" for a free e-newsletter, for more information, or for exclusive sales, offers and promotions. A survey page that is easy to fill out (name and email address are most important) is the next step. This information can then be used in a database.

The most time honored marketing method is word of mouth. Accordingly, using the current database to tell their friends about the business is a proven way to grow list. Using forward-to-a-friend and refer-a-friend tools, the audience will grow exponentially. These tools coupled with creative promotions such as special offers or drawings for those who refer friends, can build the subscriber base even more. But, as with any email marketing method, it must be used mindfully, employing permission-based methods only.

Great lists, like great buildings, are not built overnight. It takes time, often a few years, to grow a list that delivers big returns. A slowly built list ensures that users grow a community of patrons who rarely opt out. Email marketing campaigns are best implemented when integrated with and supported by other marketing efforts. That means the email marketing strategy should be part of printed collateral, in store and on-location promotions, advertising and trade show booth promotions. Every piece of paper about the business should include a link to the website and email subscription information.

The present invention provides a solution to these needs and other problems, and offers other advantages over the prior art.

BRIEF SUMMARY OF THE INVENTION

The present invention is related to a software system that solves the above-mentioned problems. In accordance with one embodiment, a computerized subscriber list creation and management system for use on the internet or other network is described. In a preferred embodiment, a business may conduct advanced database search queries, then save, manage and update those searches automatically. A business may build subscriber lists using multi-part rules determined by customer data including demographics, preferences, and behaviors. Moreover, the business may save the searches and manage database segments effectively for use in multiple campaigns. In a preferred embodiment, the subscriber lists update automatically as the database grows and changes.

Additional advantages and features of the invention will be set forth in part in the description which follows, and in part, will become apparent to those skilled in the art upon examination of the following or may be learned by practice of the invention.

BRIEF DESCRIPTION OF THE DRAWINGS

FIGS. 3-1 and 3-2 illustrate subscriber list system and method summary and snapshot boxes.

FIG. 6 highlights excluded groups.

FIG. 7 shows the page for searching subscribers by field and group.

FIGS. 8-1 and 8-2 illustrate a statistics page for subscriber list system and method.

DETAILED DESCRIPTION

Figure 1:
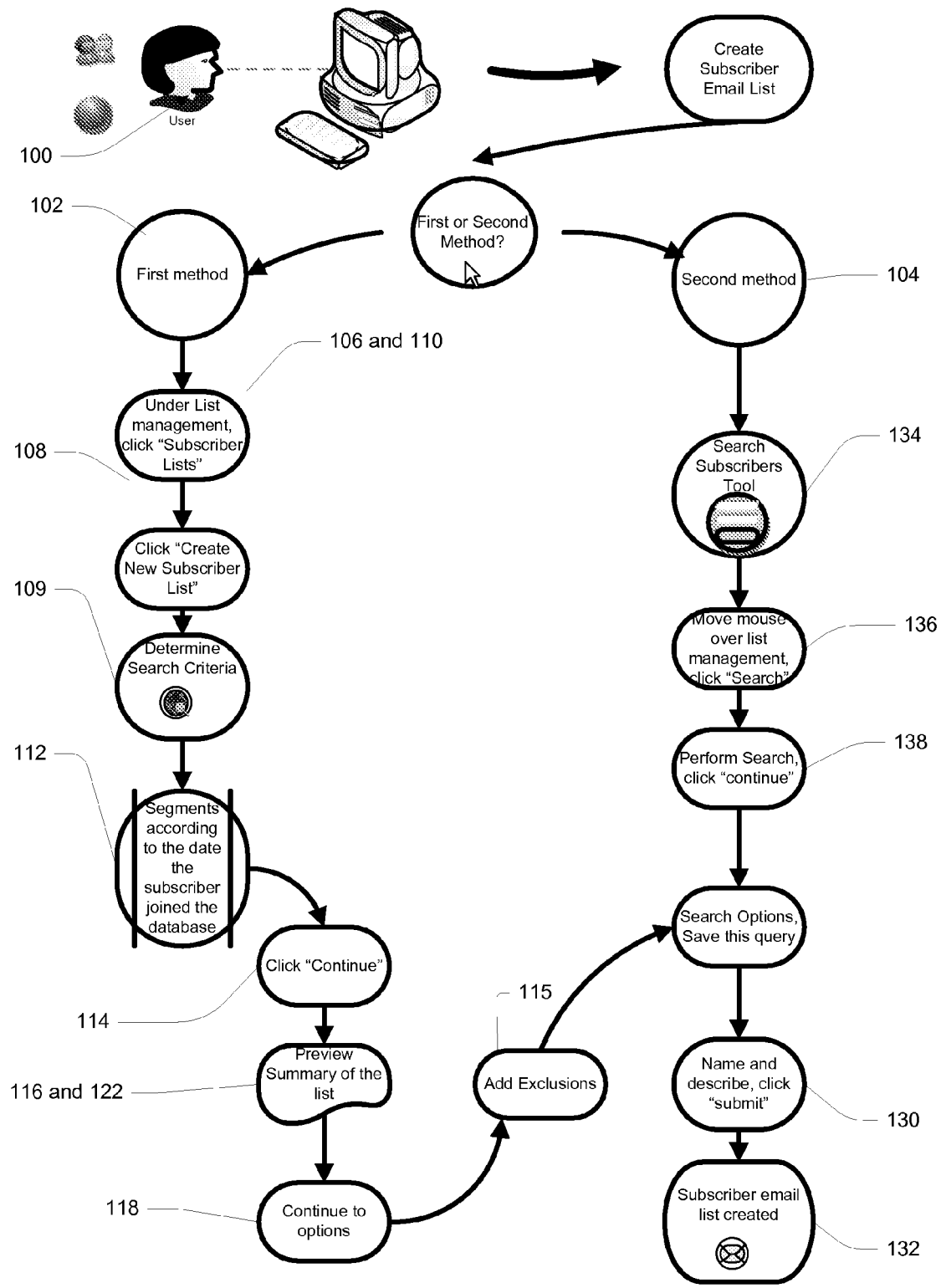
FIG. 1 shows a flow chart of two different methods of creating a subscriber list.

The ability to communicate personally with customers about products and services they are interested in is one of the most important advantages e-marketing offers over traditional channels. In a preferred embodiment, subscriber list management makes email messaging personal and relevant. This embodiment is presented herein using an email campaign system. As will be evident to one of ordinary skill in the art, the principles of this invention are applicable to other email campaign systems and products. Together, these two features enable easy, profitable engagement with customers using content, images and offers that correspond to the customer interests and behaviors.

In a preferred embodiment of subscriber list system and method, a business, using a software module, may conduct advanced database search queries, then save, manage and update those searches automatically. A business may build subscriber lists using multi-part rules determined by customer data including demographics, preferences, and behaviors. Moreover, the business may save the searches and manage database segments effectively for use in multiple campaigns. Subscriber lists update automatically as the database grows and changes.

In accordance with another aspect of subscriber list system and method, once the subscriber lists are built, a user may use an email campaign manager to send personalized messages to each group using a single email template. If customers and subscribers fall into multiple groups, the business may choose to send them all content that is relevant or select which content gets served by order of importance. It will be understood that the subscriber lists may be grouped based on the customer demographics, preference settings, and shopping behaviors. Furthermore, a subscriber list query using multi part rules may be utilized to gather such information.

Additionally, another aspect of subscriber list system and method may help with the common problem of abandoned shopping carts. It will be understood by those skilled in the art that a shopping cart is a piece of software that acts as an online store's catalog and ordering process. Typically, a shopping cart is the interface between a company's Web site and its deeper infrastructure, allowing consumers to select merchandise; review what they have selected; make necessary modifications or additions; and purchase the merchandise. Shopping carts can be sold as independent pieces of software so companies can integrate them into their own unique online solution, or they can be offered as a feature from a service that will create and host a company's e-commerce site. In a preferred embodiment, subscriber list system and method sends customers that have an abandoned shopping cart a personalized invitation or incentive to pick up where they left off in the checkout process. Furthermore, subscriber list system and method can track items that are discarded from a customer's shopping cart and then send them personalized emails with a special offer on the items they removed.

Additionally, the problem of missed up-sell opportunities can be solved using subscriber list system and method. It will be understood by those skilled in the art that up-selling is to sell customers a higher-priced version of a product they have bought previously. The business can deploy subscriber list system and method in tandem with any event-triggered messaging capabilities to schedule communications based on the sales cycle and the customer's service needs.

Referring now to FIG. 1, to create a subscriber list, there are basically two methods. First, a user 100 may build a list from scratch 102. Second, the user may conduct a search that is saved as a subscriber list 104. It will be understood that the user 100 would be utilizing any computer system and/or web interface.

In the first method 102, the user 100 would first mouse over the "list management" 106 section of a navigation bar, then click "Subscriber Lists" 110. It will be understood that for purposes of this explanation, "Smart Lists" is interchangeable with "Subscriber Lists." Thereafter, the user 100 clicks on the button called "create new subscriber list" 108. The user 100 then determines the search criteria 109. It will be understood by those skilled in the art that the user 100 can use all the functions that apply to search subscribers, including wildcards, recency and frequency information 120. Recency is the length of time since a customer's last purchase. The user may also search using some new criteria, such as custom date fields 128, click-thru and open behavior 124. As will be evident to one with ordinary skill in the art, click—thru is a revenue option for web masters. By placing a banner on their site, the web master receives a set dollar amount or referral fee each time a user clicks on the banner to visit the sponsor's site.

Next the user 100 segments 112 according to the date the subscribers joined the database. After defining the search criteria, the user clicks "Continue" 114. Thereafter, the user 100 is taken to a page that lets them preview the subscriber list. This shows the user 100 the subscriber list summary and snapshot 116 and it gives the user 100 an opportunity to fine tune their list in the options section 118. Finding such information such as the date the subscribers joined the database may be accomplished by utilizing a subscriber list query. The subscriber list query may additionally utilize multi part rules in finding such information.

Once the user 100 has determined that the summary 116 and snapshot 122 look good, they may continue on to options. The user 100 may further target the subscribers in this list by adding some exclusions 115 to their criteria. The user 100 can choose to exclude subscribers based on groups they created earlier. For instance, if the user 100 wants to exclude subscribers who have asked to receive recipes and those that want information about summer wear. By clicking on these categories, those two groups are excluded from the subscriber list. Next, the user 100 clicks "submit" and is taken back to the summary page. The user 100 may then save the information, add a description to the subscriber list, and a name 130. Once the user 100 clicks "submit" one more time, they will be done with the first method of subscriber list creation 132.

A second method 104 to create a subscriber list uses a "Search Subscribers" tool 134. The user 100 moves the cursor or mouse over "list management" 106 and "search," then clicks "search" 136 again. The user 100 then performs the search, clicks "continue" 138 and then scrolls down to the "search options" box and clicks the radio button that allows them to "save this query as a subscriber list." The user 100 names and describes the list, then clicks "submit" 130. Basically, this query utilizes multi part rules to search a database that has gathered customer profile information. Customer demographics, preference settings, and shopping behaviors are also utilized in finding the customer profile information.

Figure 2:
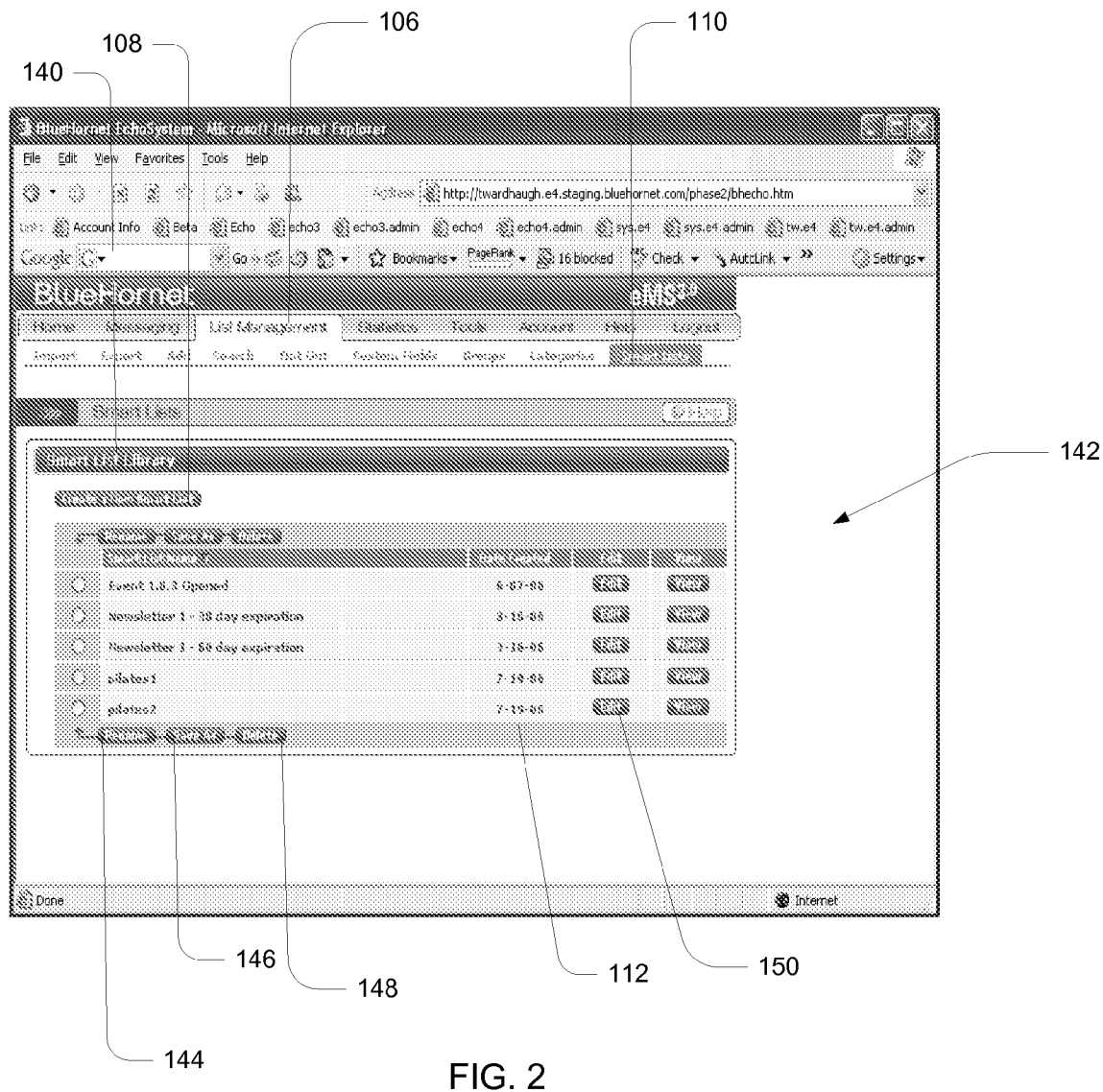
FIG. 2 illustrates a subscriber list system and method library for creating a new subscriber list.

Referring now to FIG. 2, the front end functionality of subscriber list system and method is described. It illustrates a "library" 140. Some of the features of subscriber list system and method here include that when the user 100 has no subscriber lists saved, only a "Create a New Subscriber List" 108 button is displayed. Furthermore, clicking "Create a New Subscriber List" 108 brings the user 100 to a subscriber list creation page 142. Here the user 100 is able to "rename" 144, "save as" 146, and "delete" 148 subscriber lists using buttons on the top and bottom of the table. "Rename" 144 and "save as" 146 do not allow the user 100 to name a subscriber list a name that is already in use. Moreover, "delete" 148 requires user confirmation before acting. Another feature is that subscriber lists can be sorted by name and date modified in both ascending and descending order 112. Clicking "edit" 150 brings the user 100 to a subscriber lists edit page. Clicking "view" 152 brings the user 100 to a subscriber lists view page. It will be understood that deleting a subscriber list only removes that one particular method of categorization. No subscribers are removed from the database or from any other groups or subscriber lists to which they currently belong.

To copy a subscriber list the user 100 again begins by viewing ("view") 152 the lists. Next, the user 100 selects the appropriate list and then clicks the "save as" 146 button. In a pop-up window that appears, the user 100 then gives the list another name and clicks "save as" again. Lastly, to rename a subscriber list, the user follows the same procedure as for copying. However this time the user clicks the "rename" 144 button and follows the prompts.

Figures 1, 3:
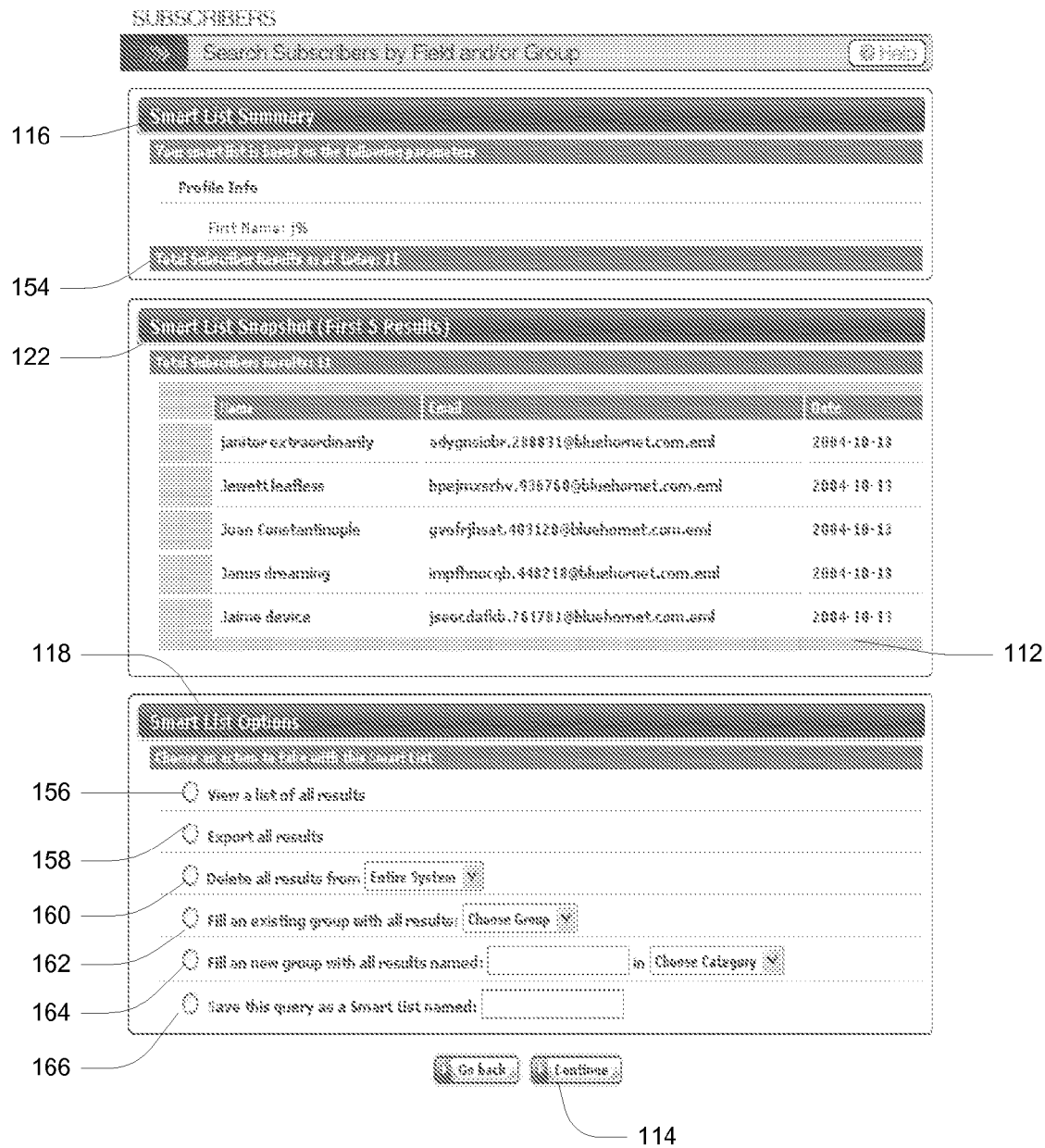
Figures 2, 3:
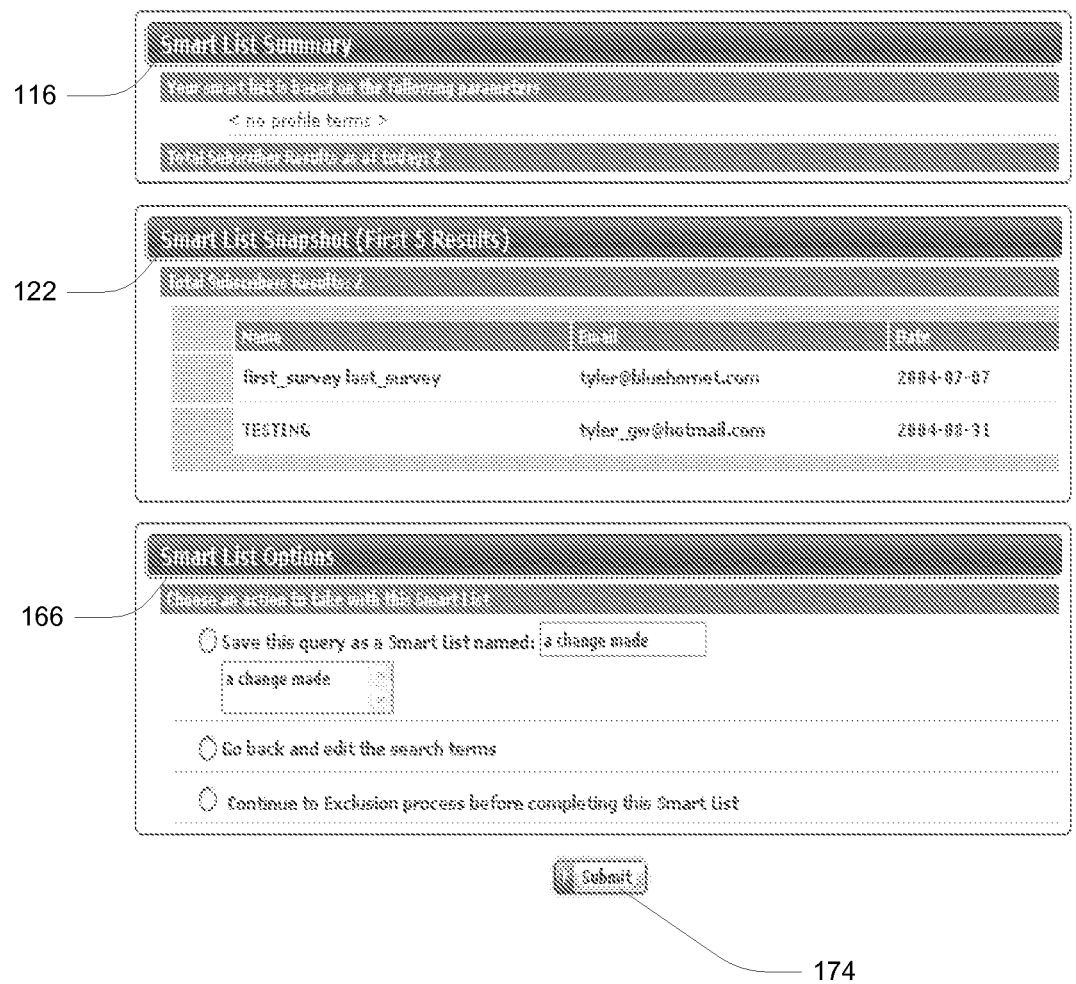

FIG. 3-1 illustrates a screen shot for searching subscribers by field or group. The subscriber list email management system summary 116 contains profile information that is an easily readable version of all search terms entered. These search parameters could have been entered in the first 102 or second 104 method of creating subscriber lists in FIG. 1. Furthermore, subscriber list email management system summary 116 contains the correct number of total subscriber results 154 (how many subscribers matched the terms).

Referring again to FIG. 3-1, the subscriber list system and method snapshot 122 displays five subscribers when the search terms match five or more subscribers and "n" subscribers when the search terms match "n" subscribers (where 0<n<5). Clicking on subscribers listed in the snapshot 122 brings the user 100 to a subscriber maintenance page. The snapshot 122 table may be sorted by subscriber name, email, and date 112 in both ascending and descending order. It will be evident by those skilled in the art that pressing "continue" 114 without choosing an action pops up an alert asking the user 100 to select an action. Choosing "view a list of all results" 156 brings the user 100 to a results page with the subscriber list system and method search parameters used as search terms. Or, choosing "export all results" 158 brings the user 100 to an export page which, when completed, exports subscribers that match the subscriber list. If groups are part of the search parameters, the dropdown in "Delete all results" 160 contains "Choose", "Searched Groups", and "Entire System", which "Choose" selected by default. If groups are not part of the search parameters, the dropdown in "Delete all results" 160 contains "Entire System", which is selected by default. Choosing "Delete all subscribers from Choose" pops up an alert box asking the user to select "Entire System" or "Searched Groups". Choosing "Delete all subscribers from Searched Groups" brings the user 100 to a subscriber delete page and, when completed, deletes subscribers from the groups searched in the subscriber list. Choosing "Delete all subscribers from Entire System" brings the user 100 to the subscriber delete page and, when completed, deletes subscribers from the system. The dropdown in "Fill an existing group with all results" 162 contains the phrase "Choose group" (selected by default) and all groups in the user's 100 system. Choosing "Fill an existing group with all results: Choose group" pops up an alert asking the user 100 to select a group to fill. Choosing "Fill an existing group with all results: <group name>" pops up a confirmation dialog. Selecting "Yes" completes the action and "No" aborts the action.

Additionally, the dropdown in "Fill a new group with all results named" 164 contains the phrase "Choose Category" (selected by default), the word "Uncategorized", and all the categories in the user's 100 system. Choosing "Fill a new group with all results named:" and a blank text box pops up an alert asking the user 100 to enter a name. Choosing "Fill a new group with all results named: <a name of a group already in the system>" pops up an alert informing the user 100 the name is currently in use. Choosing "Fill a new group with all results named: <a new name> in Choose Category" pops up an alert asking the user 100 to select a category. Choosing "Fill a new group with all results named: <a new name> in <a category or "Uncategorized"> pops up a confirmation dialog. Again, selecting "Yes" completes the action and "No" aborts.

FIG. 3-2 shows the options box 118 with saving options 166. Choosing "Save this query as a subscriber list named: <a name of a subscriber list already in the system>" 166 pops up an alert informing the user 100 the name is currently in use. Choosing "Save this query as a subscriber list named: <a new name>" brings the user to the library (See FIG. 2), with the subscriber list just created included in the list.

Figure 4:
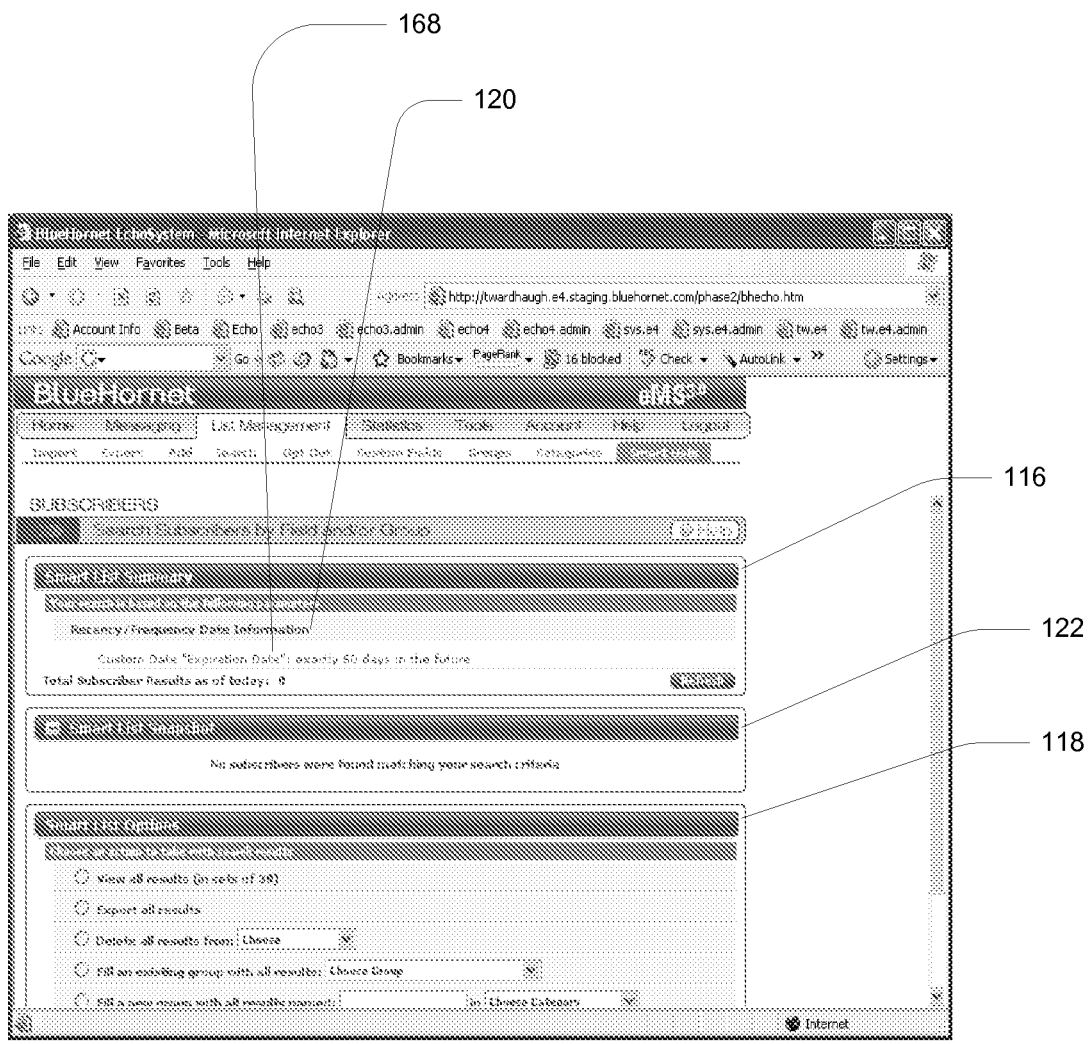
FIG. 4 shows subscriber list system and method summary without any subscribers listed.

FIG. 4 describes similar data as in FIGS. 3-1 and 3-2 except the snapshot 122 and the summary 116 are not populated by subscribers. This is because no subscribers were found in the search criteria. Recency information 120 is one of the parameters in this search, with "Custom Date—Expiration Date exactly 60 days in future" 168 entered as a search parameter. The same options table 118 as in FIG. 3 is shown as well. It will be evident to one of ordinary skill in the art that the page is composed of 3 pods (Subscriber List {Summary,Snapshot (First 5 Results),Options}) when the subscriber lists search parameters match subscribers. Page is composed of 2 pods (Subscriber List {Summary,Options}) when the subscriber lists search parameters match no subscribers. Furthermore, it will be evident to those with ordinary skill in the art that, in terms of programming style, subscriber lists are designed and implemented as object-oriented components. The various types of subscriber lists and the common methods for accessing them are organized into hierarchical classes, taking advantage of class inheritance and polymorphism. Subscriber lists core classes may exist in the library file "subscriber_functions.php" in a functions directory. Related front-end classes, such as a subscriber list display class, which outputs various hyper text markup language (HTML) pods for the user interface, may live in a "display_functions.php" library.

Figure 5:
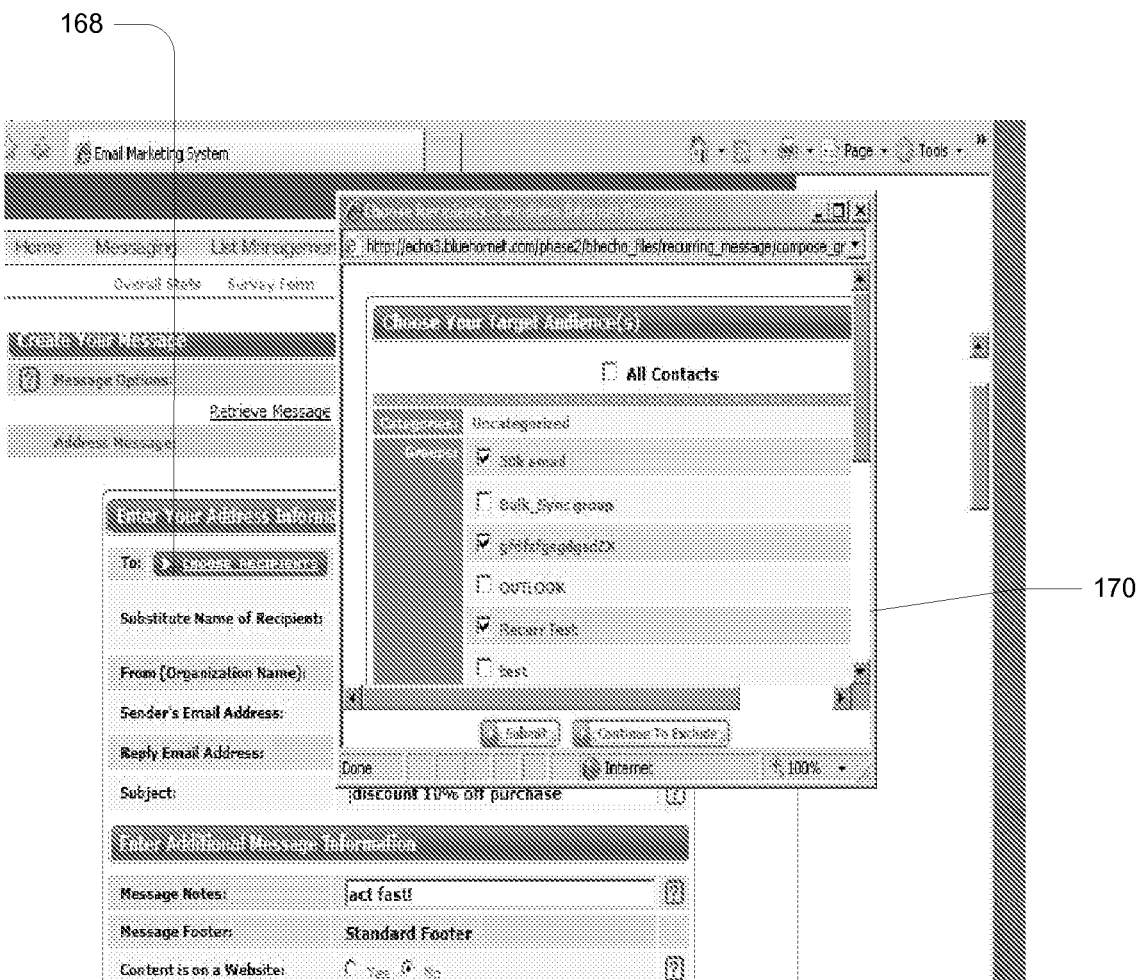
FIG. 5 illustrates a create message form page with a choose recipients box.

Referring now to FIGS. 5 and 6, the user 100 may send emails and messages as well with subscriber list system and method. In another preferred embodiment, once the subscriber list is created, the user 100 may send emails to it similar to that of sending emails to a group. For instance, say the user 100 is working on a monthly newsletter in the messaging section of the interface and they wish to send this message to some of the subscriber list. Referring to FIG. 5, the user 100 will click on the "choose recipients" 168 key, and a pop-up window 170 reveals several choices to select from in various categories and groups. The user 100 then scrolls down and the last section will show the subscriber lists. FIG. 6 shows the table 172 where the user 100 may choose to exclude certain groups here. The user 100 may select as many of these groups and subscriber list as they wish, depending on whom they want to receive the monthly newsletter. Subscriber list system and method will ensure that each subscriber receives the newsletter only once. This is in the event that a subscriber might be in more than one of the groups that the user has selected. It will be understood that the user 100 may also have the ability to exclude groups from receiving the message. Lastly, if the user 100 is satisfied with the choices, then they may click "submit" 174. The user 100 then completes the message sending process by scheduling or sending the message. In this manner, the subscriber list system and method not only segments subscriber lists into groups utilizing rules, but it may then send personalized messages. The personalized messages may contain dynamic text and/or content that will further help retain customer loyalty. The subscriber list system and method also updates automatically so any personalized messages sent over a network will be current and relevant.

Figure 7:
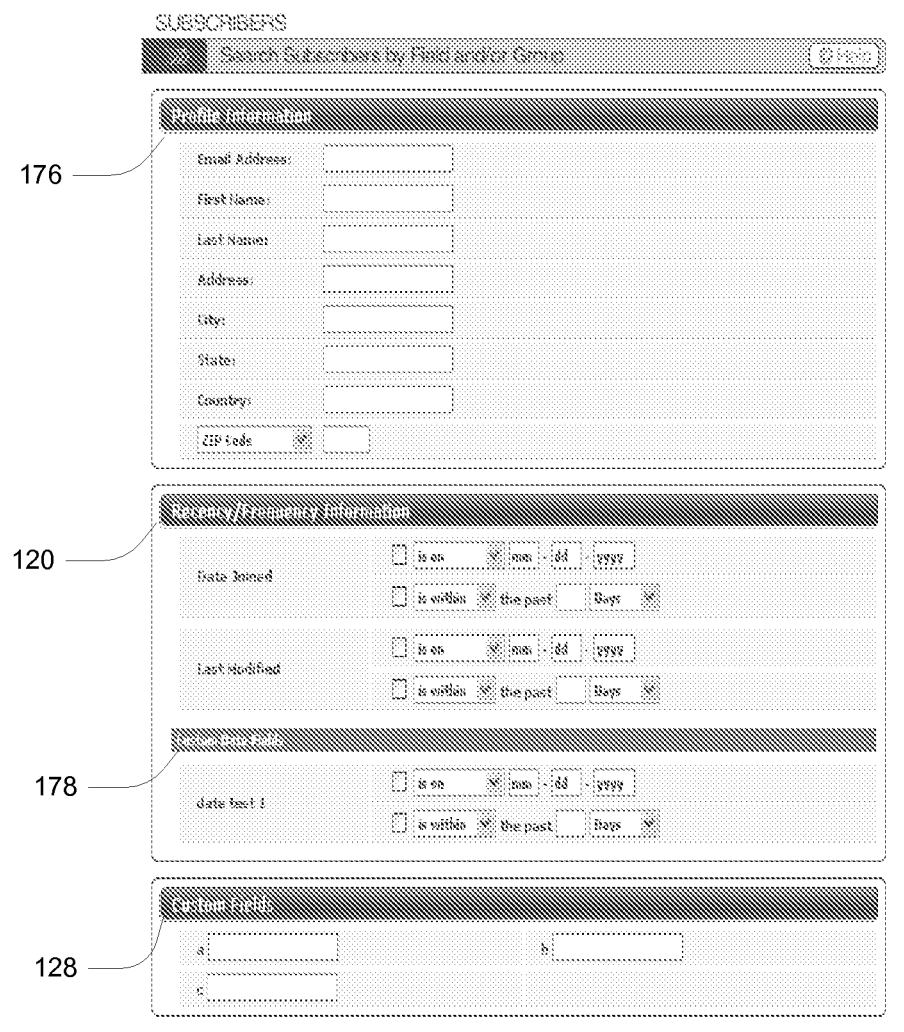

FIG. 7 describes a page that displays when the user 100 is searching subscribers by field or group. Customer profile information 176 may be filled out with email address, first and last name, address, city, state, country, and zip code. In addition, recency and frequency information 120 may be noted as well. This is by date joined and/or date modified. The user 100 may customize the date fields 178 as well. Finally, custom fields 128 are also available on this search subscriber page.

Figures 1, 8:
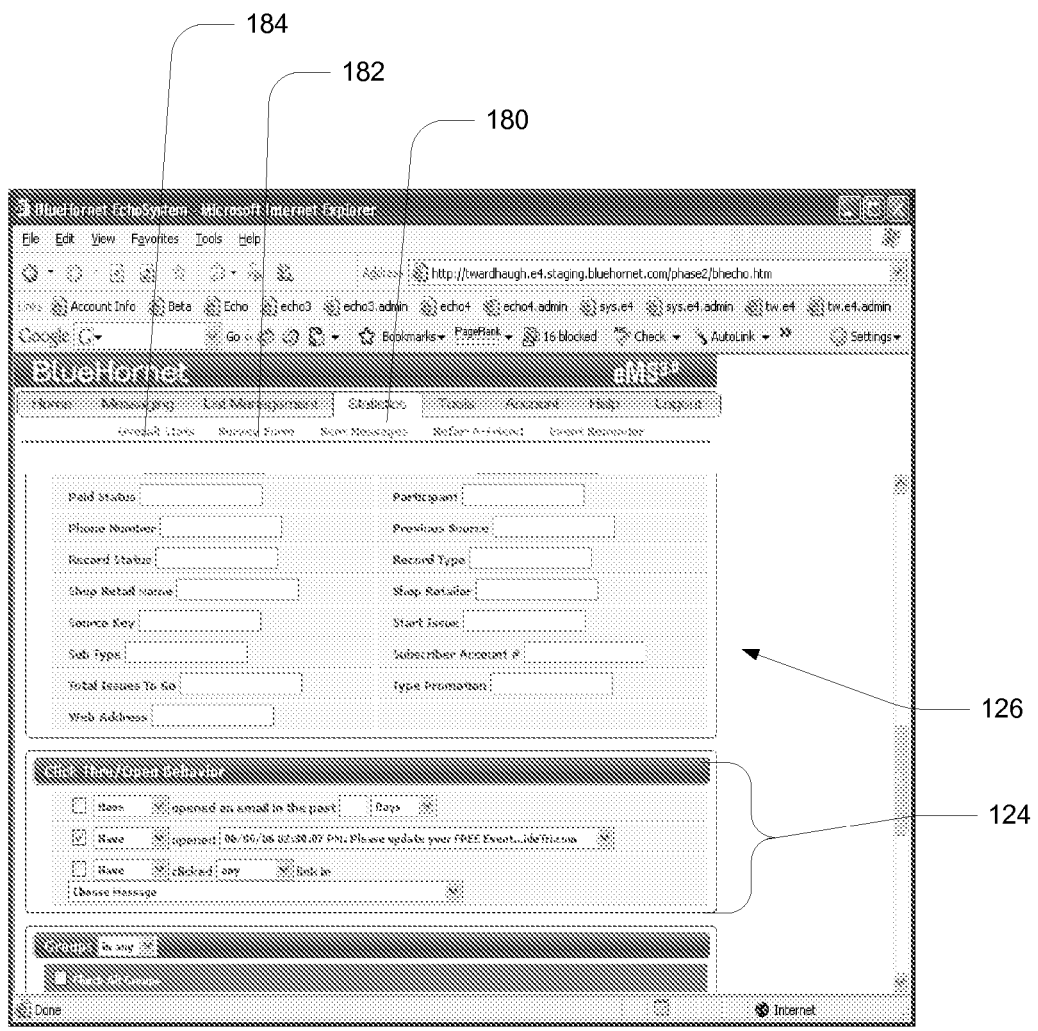
Figures 2, 8:
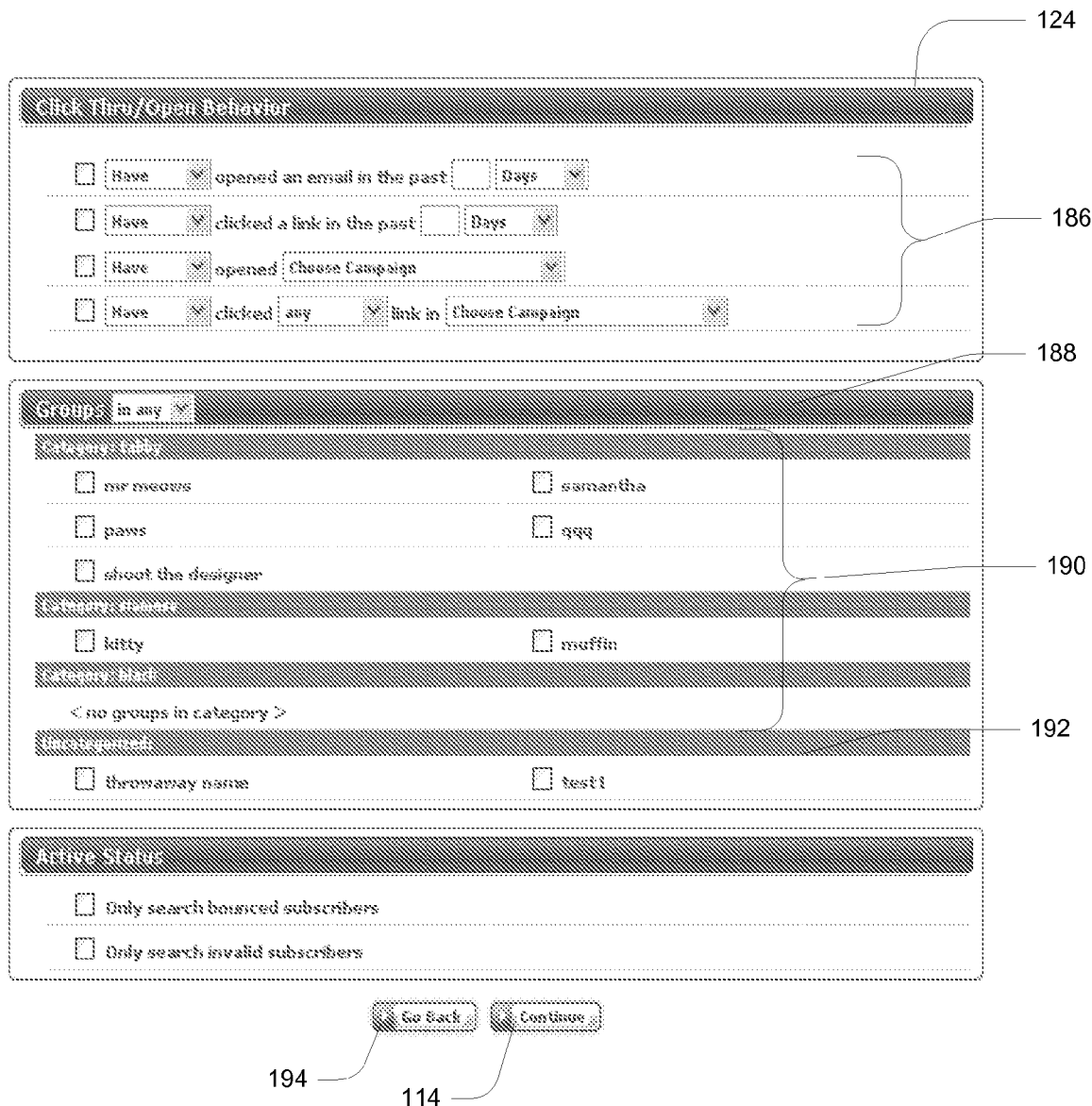

Referring now to FIG. 8-1, the user 100 may view statistical data 126 by clicking on "statistics" 180 in the toolbar. The user 100 may then fill out the fields of paid status, phone number, record status, shop retail name, source key, sub type, total issues to go, web address, participant, previous source, record type, shop retailer, start issue, subscriber account number, and type promotion. It will be understood that these fields may be changed to suit the needs of the user 100. These fields listed here are suggested fields for a survey form 182 to see overall stats 184. Also, the user 100 may check the click thru open behavior 124. As with FIG. 1, recency 120 is the length of time since a customer's last purchase. As will be evident to one with ordinary skill in the art, click thru 124 is a revenue option for web masters. By placing a banner on their site, the web master receives a set dollar amount or referral fee each time a user clicks on the banner to visit the sponsor's site.

FIG. 8-2 again displays the click thru and open behavior 124 box. It also shows a section to search groups 186. This section may be divided into different categories 188 based on customer characteristics and profile data, or be uncategorized 190. The last portion of this page has a section on active status 192. Here, the user 100 may check the respected boxes for searching bounced subscribers or searching invalid subscribers. Once the user 100 has done this, they may click "continue" 114 or "go back" 194 depending on what they wish to do.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the web interface such that different dialog boxes are presented to a user that are organized or designed differently while maintaining substantially the same functionality without departing from the scope and spirit of the present invention.

What is claimed is:

1. A computerized subscriber list system for use on a network including a server with a processor and a memory, comprising:
a database stored in a non-transitory computer-readable media within the server memory having customer profile data where each customer record includes an email address, a subscriber preference setting, and an online product shopping behavior for each customer;
a software module containing program code which when executed by the processor in the server causes the server to perform operations of building a subscriber list query from the customer profile data using multi-part rules to identify target customers that meet particular criteria based on (i) a subscriber preference setting, (ii) an online product shopping behavior, (iii) recency and frequency of purchase, (iv) options based on customer characteristics and profile data, saving the subscriber list query in a library stored in the server memory, and creating a new subscriber list automatically as matching subscriber records and data are added to the database based on the subscriber list query saved in the library a statistics module allowing the viewing of statistics related to the matching records; and an email campaign manager containing program code which when executed by the processor in the server causes the server to perform operations of sending a personalized message over the network to a customer identified from the new subscriber list which was updated automatically as subscriber records and data are added to the database so that any personalized message sent over the network will be current and relevant to an identified customer.

2. The subscriber list system of claim 1 wherein the subscriber list query comprises fields that specify click through behavior.

3. The subscriber list system of claim 1 wherein the subscriber list query comprises customized fields.

4. The subscriber list system of claim 1 wherein the subscriber list query comprises fields that specify campaign statistics.

5. The subscriber list system of claim 1 wherein the subscriber list query comprises fields that specify a group.

6. The subscriber list system of claim 1 wherein the subscriber list query comprises fields that specify active status.

7. A method for managing subscriber lists for use on a network performed by a server having a processor and memory operating under the control of program code within a software module, the method comprising steps of:

storing customer profile data in a database stored in the server memory where each customer record in the database includes an email address, a subscriber preference setting, and an online product shopping behavior for each customer;

building subscriber list query from the customer profile data using multi-part rules to identify target customers that meet particular criteria based on (i) a subscriber preference setting, (ii) online product shopping behavior, (iii) recency and frequency of purchase, and (iv) options based on based on customer characteristics and profile data;

saving the subscriber list query in a library stored in the server memory;

creating a new subscriber list automatically as matching subscriber records and data are added to the database based on the subscriber list query saved in the library providing a view of statistics related to the matching records;

and sending the personalized message from the server over the network to a customer identified in the new subscriber list which was updated automatically as subscriber records and data are added to the database so that any personalized message sent over the network will be current and relevant to an identified customer.

8. The method of claim 7 wherein the building step comprises building the subscriber list query from fields that specify click through behavior.

9. The method of claim 7 wherein the building step comprises building the subscriber list query from customized fields.

10. The method of claim 7 wherein the building step comprises building the subscriber list query from fields that specify campaign statistics.

11. The method of claim 7 wherein the building step comprises building the subscriber list query from fields that specify a group.

12. The method of claim 7 wherein the building step comprises building the subscriber list query from fields that specify active status.

* * * * *